US007778374B2

(12) United States Patent
Jeon

(10) Patent No.: US 7,778,374 B2
(45) Date of Patent: *Aug. 17, 2010

(54) DUAL REFERENCE INPUT RECEIVER OF SEMICONDUCTOR DEVICE AND METHOD OF RECEIVING INPUT DATA SIGNAL

(75) Inventor: Young-jin Jeon, Daejeon Metropolitan (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1029 days.

This patent is subject to a terminal disclaimer.

(21) Appl. No.: 11/501,073

(22) Filed: Aug. 9, 2006

(65) Prior Publication Data

US 2007/0064504 A1     Mar. 22, 2007

(30) Foreign Application Priority Data

Aug. 26, 2005     (KR) .................. 10-2005-0078909

(51) Int. Cl.
*H04L 7/00*     (2006.01)
*G01R 19/00*     (2006.01)

(52) U.S. Cl. ............... 375/372; 375/316; 375/371; 375/373; 375/374; 375/375; 375/376; 375/377; 327/51; 327/52; 327/53; 327/54; 327/55; 327/56; 327/57

(58) Field of Classification Search ......... 375/371–377; 327/52–57

See application file for complete search history.

(56) References Cited

U.S. PATENT DOCUMENTS 5,465,059 A * 11/1995 Pan et al. ................. 327/12

5,568,073 A * 10/1996 McClure ................. 327/51
5,901,088 A * 5/1999 Kraus ................. 365/185.21

(Continued)

FOREIGN PATENT DOCUMENTS

KR     1020030056402 A     7/2003

(Continued)

OTHER PUBLICATIONS

Office Action Issued in Related German Application No. 10 2006 041 648.1-31 From German Patent Office Dated Jun. 9, 2009.

(Continued)

*Primary Examiner*—Mohammad H Ghayour
*Assistant Examiner*—Sophia Vlahos
(74) *Attorney, Agent, or Firm*—Volentine & Whitt, PLLC

(57) ABSTRACT

A dual reference input receiver, and a method of receiving, wherein the input receiver includes a first input buffer which is synchronized with and enabled by a clock signal, senses a difference between the input data signal and a first reference voltage, and amplifies the sensing result; a second input buffer which is synchronized with and enabled by the clock signal, senses a difference between a second reference voltage and the input data signal, and amplifies the sensing result; and a phase detector which detects a difference between a phase of output signals of the first and second input buffers, and outputs a signal corresponding to the detection result. The first and second reference voltages may respectively be higher and lower than a median voltage of the input data signal. Thus, a single input data signal is advantageously used and a wide input data eye is provided.

24 Claims, 6 Drawing Sheets

U.S. PATENT DOCUMENTS

| | | | |
|---|---|---|---|
| 5,933,459 A * | 8/1999 | Saunders et al. | 375/317 |
| 6,160,423 A | 12/2000 | Haq | |
| 6,232,800 B1 * | 5/2001 | Hirairi | 327/55 |
| 6,262,602 B1 * | 7/2001 | Draving | 327/74 |
| 6,476,645 B1 * | 11/2002 | Barnes | 327/51 |
| 6,590,429 B2 * | 7/2003 | Choi et al. | 327/74 |
| 6,707,321 B2 * | 3/2004 | Cho et al. | 327/51 |
| 6,812,743 B2 | 11/2004 | Kim | |
| 6,836,127 B2 * | 12/2004 | Marshall et al. | 324/606 |
| 6,864,725 B2 * | 3/2005 | Cowles et al. | 327/108 |
| 6,885,222 B2 * | 4/2005 | Sato | 327/55 |
| 7,282,962 B1 * | 10/2007 | Rosen | 327/3 |
| 7,366,041 B2 * | 4/2008 | Pan et al. | 365/194 |
| 7,518,411 B2 * | 4/2009 | Kim et al. | 327/52 |
| 2003/0210078 A1 * | 11/2003 | Wijetunga et al. | 327/52 |
| 2005/0162193 A1 * | 7/2005 | Payne et al. | 327/52 |

FOREIGN PATENT DOCUMENTS

| | | |
|---|---|---|
| TW | 544834 | 8/2003 |
| WO | WO 03/054585 A1 | 7/2003 |

OTHER PUBLICATIONS

Notice of First Office Action From Taiwanese Patent Office Dated Sep. 7, 2009.

* cited by examiner

US 7,778,374 B2

DUAL REFERENCE INPUT RECEIVER OF SEMICONDUCTOR DEVICE AND METHOD OF RECEIVING INPUT DATA SIGNAL

BACKGROUND OF THE INVENTION

1. Field of the Invention

The present invention relates to a semiconductor device, and more particularly, to an input receiver of a semiconductor device and a method of receiving an input data signal performed by the input receiver.

This application claims the benefit of Korean Patent Application No. 10-2005-0078909, filed on Aug. 26, 2005, in the Korean Intellectual Property Office, the disclosure of which is incorporated herein in its entirety by reference.

2. Description of the Related Art

Semiconductor devices in a system transmit data signals to or receive data signals from one another. When receiving data signals, semiconductor devices need to determine whether the data signals are logic high or logic low. Therefore, semiconductor devices include an input receiver which receive data signals and determine whether the data signals are logic high or logic low.

Semiconductor devices in a system may transmit data signals to or receive data signals from one another in two different manners, i.e., a differential signaling method and a single-ended signaling method. An example of semiconductor devices operating in either the differential signaling method or the single-ended signaling method is disclosed in U.S. Pat. No. 6,590,429.

FIG. 1 is a diagram illustrating the waveforms of data signals transmitted between semiconductor devices using the differential signaling method. Referring to FIG. 1, in the differential signaling method, the semiconductor devices are connected to each other by two data transmission lines, and a data signal DATA and a complementary data signal /DATA are transmitted between the semiconductor devices via the respective data transmission lines. The differential signaling method can provide higher tolerance for common mode noise than the single-ended signaling method and can provide twice as wide an input data eye W1 as the single-ended signaling method. In the differential signaling method, however, two data signals, i.e., the data signal DATA and the complementary data signal /DATA, are transmitted together, thus increasing the number of pins required by semiconductor devices.

FIG. 2 is a diagram illustrating the waveform of a data signal transmitted between semiconductor devices using the single-ended signaling method. Referring to FIG. 2, in the single-ended signaling method, semiconductor devices are connected to each other by a single data transmission line, and a data signal DATA is transmitted between the semiconductor devices via the single data transmission line. The single-ended signaling method can reduce the number of pins required by semiconductor devices. However, the single-ended signaling method is more vulnerable to common mode noise than the differential signaling method and provides an input data eye W2 whose width is only half the width of an input data eye provided by the differential signaling method.

In the meantime, in order to reduce the manufacturing costs of a system and increase the performance of a system, input receivers of semiconductor devices in the system must be able to transmit as much data as possible using as few data transmission lines as possible and to provide as wide an input data eye as possible.

SUMMARY OF THE INVENTION

Therefore, an object of the present invention is to provide a dual reference input receiver of a semiconductor device which can provide an input data eye as wide as an input data eye provided by a differential signaling method and can reduce the number of pins as in a single-ended signaling method.

A further object of the present invention is to provide a method of receiving an input data signal of a semiconductor device which can provide an input data eye as wide as an input data eye provided by a differential signaling method and can reduce the number of pins as in a single-ended signaling method.

To achieve these and other objects, in accordance with a first aspect, there is provided an input receiver which receives an input data signal, wherein the input receiver includes a first input buffer which is synchronized with and enabled or disabled by a clock signal, which senses a difference between a voltage of the input data signal and a first reference voltage, and which amplifies the sensing result, the input data signal and the first reference voltage being respectively input to a positive input terminal and a negative input terminal of the first input buffer; a second input buffer which is synchronized with and enabled or disabled by the clock signal, which senses a difference between a second reference voltage and the voltage of the input data signal, and which amplifies the sensing result, the second reference voltage and the input data signal being respectively input to a positive input terminal and a negative input terminal of the second input buffer; and a phase detector which detects a difference between a phase of an output signal of the first input buffer and a phase of an output signal of the second input buffer and which outputs a predetermined output signal corresponding to the detection result.

The first reference voltage may be higher than a median voltage of the input data signal. The second reference voltage may be lower than a median voltage of the input data signal.

According to another aspect, there is provided an input receiver which receives an input data signal, wherein the input receiver includes a first input buffer which senses a difference between a voltage of the input data signal and a first reference voltage and which amplifies the sensing result, the input data signal and the first reference voltage being respectively input to a positive input terminal and a negative input terminal of the first input buffer; a second input buffer which senses a difference between a second reference voltage and a voltage of the input data signal and which amplifies the sensing result, the second reference voltage and the input data signal being respectively input to a positive input terminal and a negative input terminal of the second input buffer; and a phase detector which detects a difference between a phase of an output signal of the first input buffer and a phase of an output signal of the second input buffer and which outputs a predetermined output signal corresponding to the detection result.

The first reference voltage may be higher than a median voltage of the input data signal. The second reference voltage may be lower than a median voltage of the input data signal.

According to another aspect, there is provided an input receiver which receives an input data signal, wherein the input receiver includes a first differential amplifier-type input buffer which senses a difference between a first reference voltage and a voltage of the input data signal and which differentially amplifies the sensing result, the first reference voltage and the input data signal being respectively input to a positive input terminal and a negative input terminal of the first differential amplifier-type input buffer; a second differential amplifier-type input buffer which senses a difference between the voltage of the input data signal and a second reference voltage and which differentially amplifies the sensing result, the input data signal and the second reference voltage being respectively input to a positive input terminal and a negative input terminal of the second differential amplifier-type input buffer; a first sense amplifier-type input buffer which is synchronized with and enabled or disabled by a clock signal, which senses a difference between a voltage of an output signal of the first differential amplifier-type input buffer and a voltage of a complementary signal of the output signal of the first differential amplifier-type input buffer, and which amplifies the sensing result, the output signal and the complementary output signal being respectively input to a negative input terminal and a positive input terminal of the first sense amplifier-type input buffer; a second sense amplifier-type input buffer which is synchronized with and enabled or disabled by the clock signal, which senses a difference between a voltage of an output signal of the second differential amplifier-type input buffer and a voltage of a complementary signal of the output signal of the second differential amplifier-type input buffer, and which amplifies the sensing result, the output signal and the complementary output signal being respectively input to a negative input terminal and a positive input terminal of the second sense amplifier-type input buffer; and a phase detector which detects a difference between a phase of an output signal of the first sense amplifier-type input buffer and a phase of an output signal of the second sense amplifier-type input buffer, and which outputs a predetermined output signal corresponding to the detection result.

The first reference voltage may be higher than a median voltage of the input data signal. The second reference voltage may be lower than a median voltage of the input data signal.

According to another exemplary embodiment, there is provided a method of receiving an input data signal, wherein the method includes receiving the input data signal and a first reference voltage which is higher than a median voltage of the input data signal, respectively via a positive input terminal and a negative input terminal of a first input buffer, and outputting a first output signal by enabling the first input buffer to sense a difference between a voltage of the input data signal and the first reference voltage and to amplify the sensing result; receiving a second reference voltage which is lower than the median voltage of the input data signal, and the input data signal, respectively via a positive input terminal and a negative input terminal of a second input buffer, and outputting a second output signal by enabling the second input buffer to sense a difference between the second reference voltage and the voltage of the input data signal and to amplify the sensing result; and enabling a phase detector to detect a difference between a voltage of the first output signal and a voltage of the second output signal and to output a, predetermined output signal corresponding to the detection result.

The first reference voltage may be higher than a median voltage of the input data signal. The second reference voltage may be lower than a median voltage of the input data signal.

According to another aspect, there is provided a method of receiving an input data signal, wherein the method includes receiving a first reference voltage which is higher than a median voltage of the input data signal, and the input data signal, respectively via a positive input terminal and a negative input terminal of a first differential amplifier-type input buffer, and enabling the first differential amplifier-type input buffer to sense a difference between a voltage of the input data signal and the first reference voltage and to differentially amplify the sensing result; receiving the input data signal and a second reference voltage which is lower than the median voltage of the input data signal, respectively via a positive input terminal and a negative input terminal of a second differential amplifier-type input buffer, and enabling the second differential amplifier-type input buffer to sense a difference between the second reference voltage and the voltage of the input data signal and to differentially amplify the sensing result; receiving an output signal of the first differential amplifier-type input buffer and a complementary output signal of the output signal of the first differential amplifier-type input buffer respectively via a negative input terminal and a positive input terminal of a first sense amplifier-type input buffer, and outputting a first output signal by enabling the first sense amplifier-type input buffer to sense a difference between the output signal and the complementary output signal of the first differential amplifier-type input buffer and to amplify the sensing result while the clock signal is in the first logic state; receiving an output signal of the second differential amplifier-type input buffer and a complementary signal of the output signal of the second differential amplifier-type input buffer respectively via a negative input terminal and a positive input terminal of a second sense amplifier-type input buffer, and outputting a second output signal by enabling the second sense amplifier-type input buffer to sense a difference between the output signal and the complementary output signal of the second differential amplifier-type input buffer and to amplify the sensing result while the clock signal is in the first logic state; and enabling a phase detector to detect a difference between a voltage of the first output signal and a voltage of the second output signal and to output a predetermined output signal corresponding to the detection result.

The first reference voltage may be higher than a median voltage of the input data signal. The second reference voltage may be lower than a median voltage of the input data signal.

BRIEF DESCRIPTION OF THE DRAWINGS

The above and other objects, features and advantages of the present invention will become more apparent from the following description of exemplary embodiments thereof, with reference to the accompanying drawings, in which.

DETAILED DESCRIPTION OF EXEMPLARY EMBODIMENTS

Figure 1:
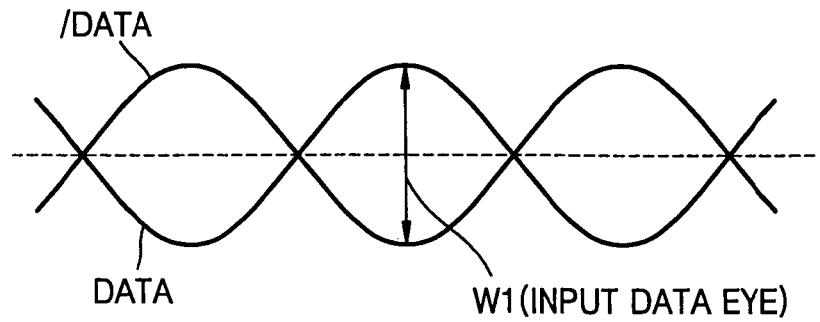
FIG. 1 is a diagram illustrating the waveforms of signals transmitted between semiconductor devices using a differential signaling method.
Figure 2:
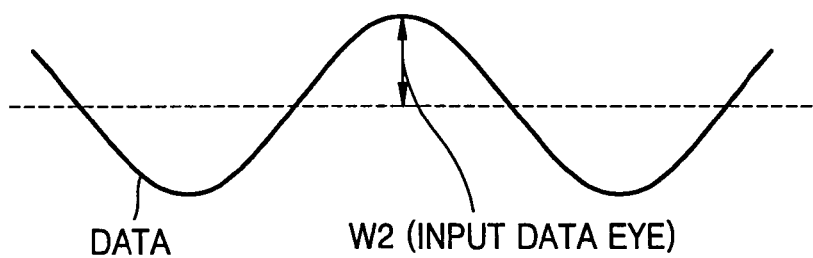
FIG. 2 is a diagram illustrating the waveform of a signal transmitted between semiconductor devices using a single-ended signaling method.

The present invention will now be described more fully with reference to the accompanying drawings in which exemplary embodiments of the invention are shown. In the drawings, like reference numerals represent like elements.

Figure 3:
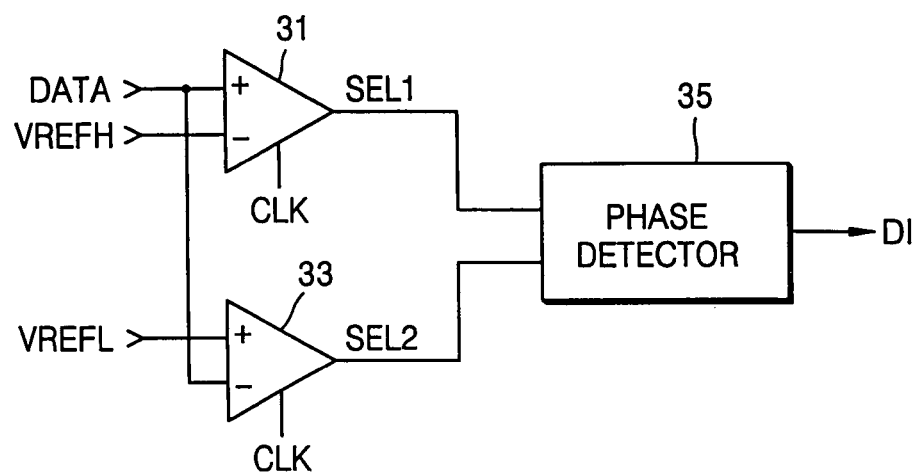
FIG. 3 is a block diagram of a dual reference input receiver according to an exemplary embodiment.

FIG. 3 is a block diagram of a dual reference input receiver according to an exemplary embodiment. Referring to FIG. 3, the dual reference input receiver includes a first input buffer 31, a second input buffer 33, and a phase detector 35.

The first input buffer 31 senses a difference between the voltage of an input data signal DATA and a first reference voltage VREFH, amplifies the sensing result, and outputs an output signal SEL1 as the amplification result. Here, the input data signal DATA is synchronized with a clock signal CLK and is input to a positive input terminal (+) of the first input buffer 31, and the first reference voltage VREFH is input to a negative input terminal (−) of the first input buffer 31. As will be subsequently described, the first input buffer 31 is enabled/disabled by the clock signal CLK. The second input buffer 33 senses a difference between a second reference voltage VREFL and the input data signal DATA, amplifies the sensing result, and outputs an output signal SEL2 as the amplification result. Here, the second reference voltage is synchronized with the clock signal CLK and is input to a positive input terminal (+) of the second input buffer 33, and the input data signal DATA is input to a negative input terminal (−) of the second input buffer 32. Also, the second input buffer 33 is enabled/disabled by the clock signal CLK.

The phase detector 35 detects a difference between the phase of the output signal SEL1 output by the first input buffer 31 and the phase of the output signal SEL2 output by the second input buffer 33, and outputs an output signal DI corresponding to the detection result.

Here, the first reference voltage VREFH is higher than a median voltage of the input data signal DATA, and the second reference voltage VREFL is lower than the median voltage of the input data signal DATA. A voltage generated inside a semiconductor device or a power supply voltage VDD may be used as the first reference voltage VREFH. A voltage generated inside a semiconductor device or a ground VSS may be used as the second reference voltage VREFL.

Figure 5:
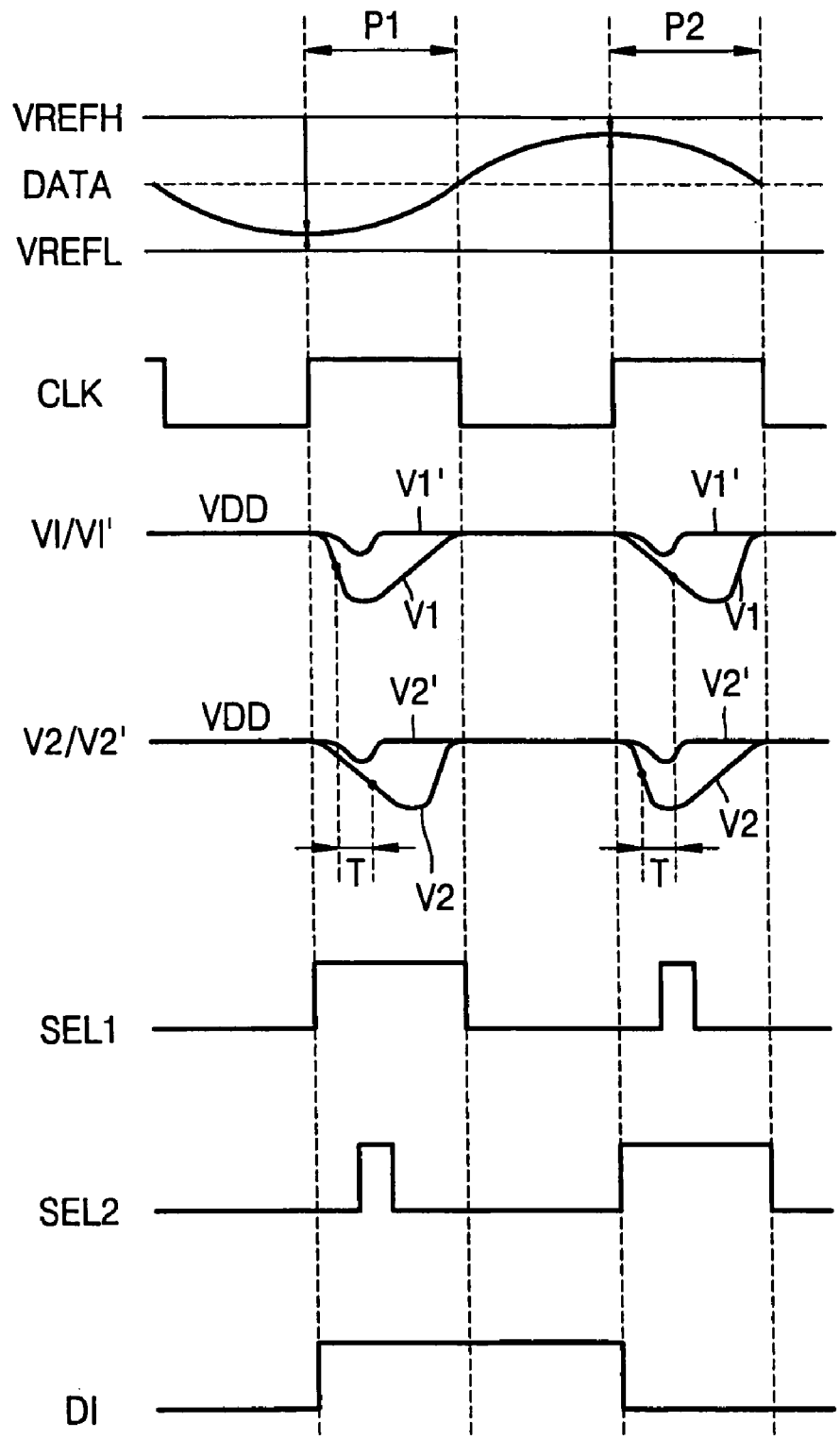
FIG. 5 is a diagram illustrating the waveforms of signals associated with the dual reference input receiver of FIG. 4 according to an exemplary embodiment.
Figure 6:
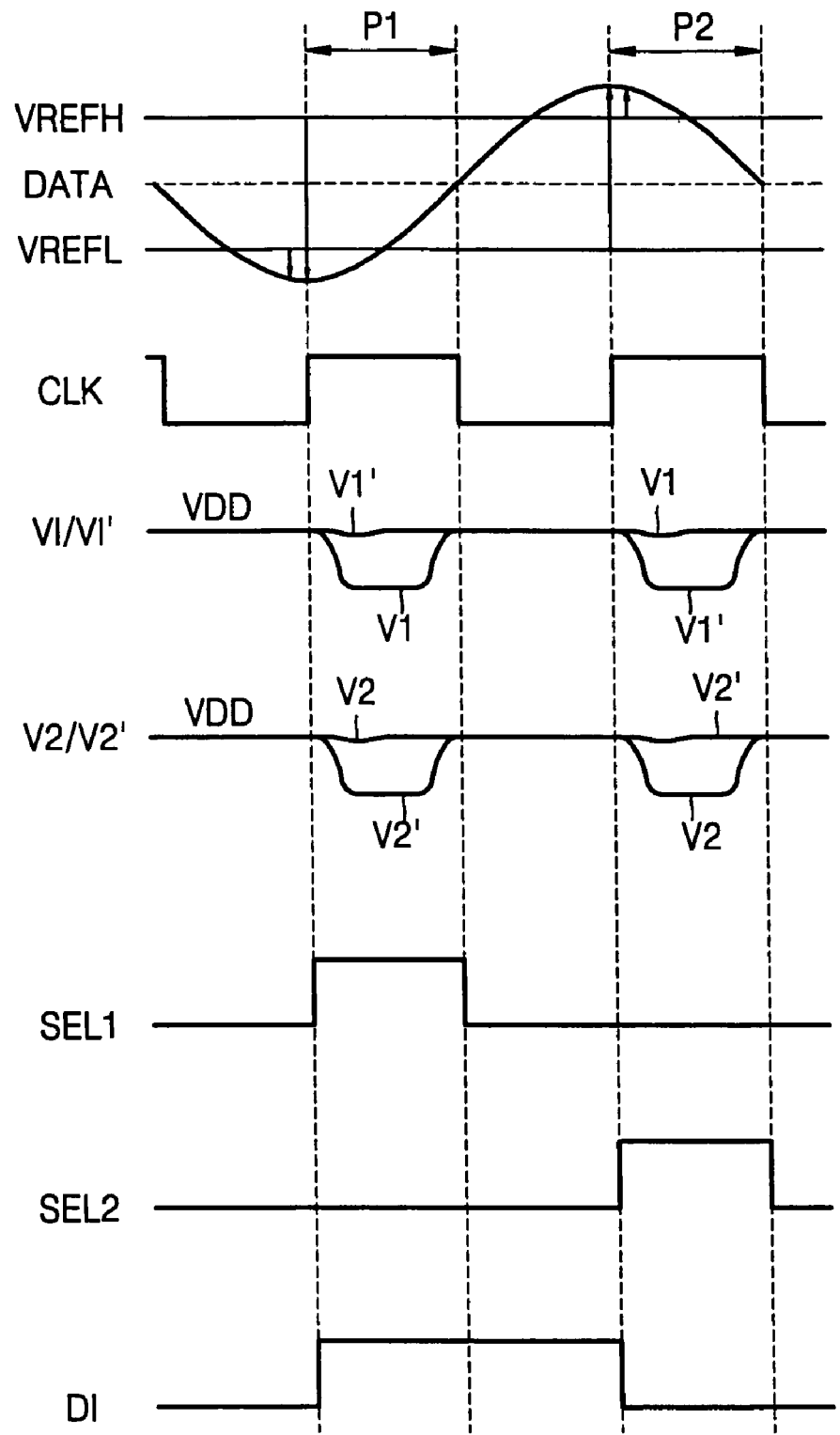
FIG. 6 is a diagram illustrating the waveforms of signals associated with the dual reference input receiver of FIG. 4 according to another exemplary embodiment.

In detail, the first input buffer 31 detects a low level of the input data signal DATA and compares the input data signal DATA with the first reference voltage VREFH, because the difference between the first reference voltage VREFH and the voltage of the input data signal DATA is maximized when the voltage of the input data signal DATA is minimized, as illustrated in FIGS. 5 and 6.

The second input buffer 33 detects a highest voltage of the input data signal DATA and compares the input data signal DATA with the second reference voltage VREFL, because the difference between the second reference voltage VREFL and the voltage of the input data signal DATA is maximized when the voltage of the input data signal DATA is maximized, as illustrated in FIGS. 5 and 6.

Figure 4:
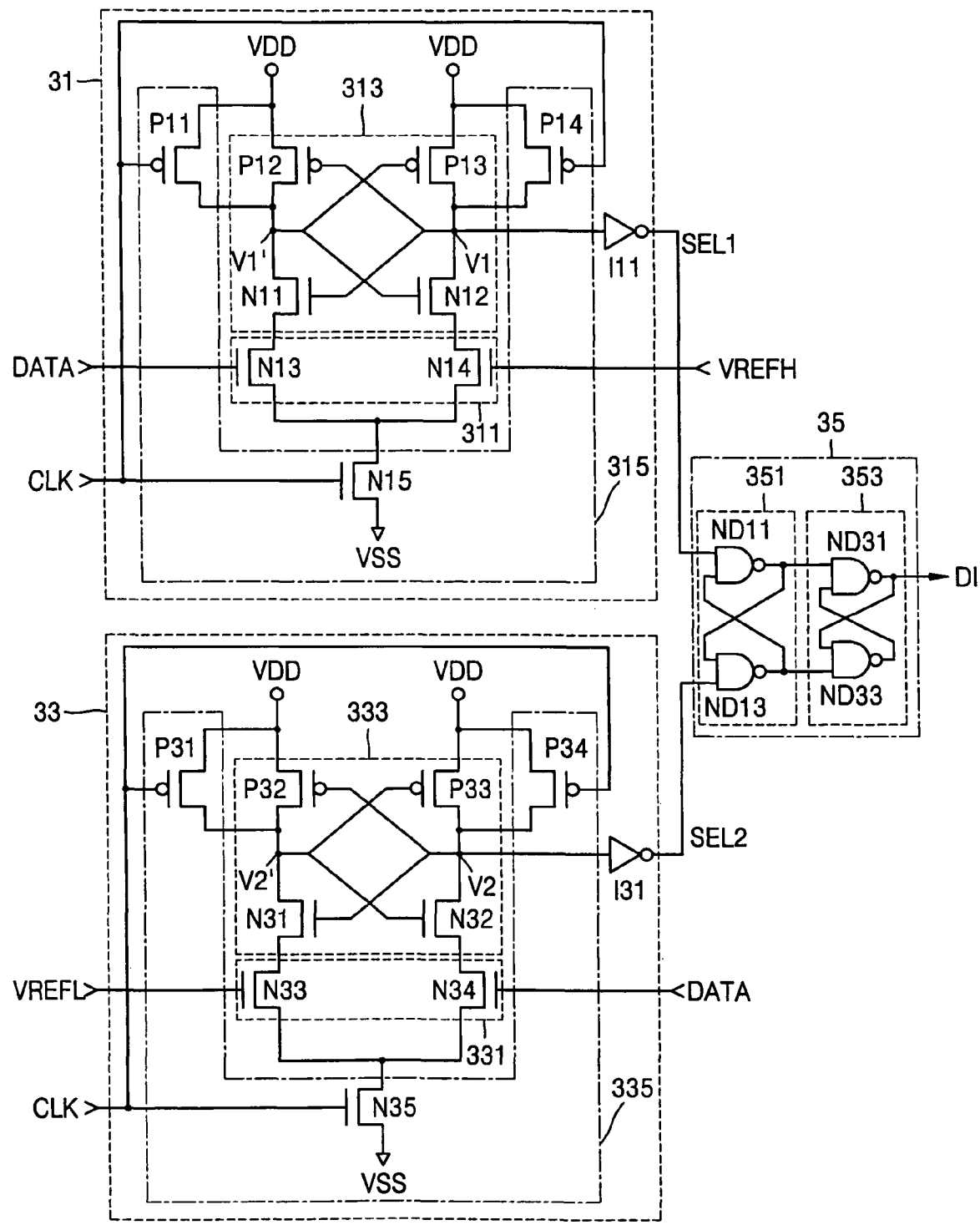
FIG. 4 is a circuit diagram of the dual reference input receiver of FIG. 3 according to an exemplary embodiment.

FIG. 4 is a circuit diagram of a dual reference input receiver according to an exemplary embodiment. Referring to FIG. 4, a first input buffer 31 is designed as a cross-coupled sense amplifier and includes an input reception unit 311, a sense amplification unit 313, a control unit 315, and an inverting buffer 111. The input reception unit 311 includes: a first input transistor N13 which has a gate to which an input data signal DATA is applied; and a second input transistor N14 which has a gate to which a first reference voltage VREFH is applied. The gate of the first input transistor N13 corresponds to a positive input terminal (+) of the first input buffer 31, and the gate of the second input transistor N14 corresponds to a negative input terminal (−) of the first input buffer 31. Here, the first and second input transistors N13 and N14 may be NMOS transistors.

The sense amplification unit 313 is connected between a first end of the first input transistor N13 and a first end of the second input transistor N14, senses a difference between the voltage at the first end of the first input transistor N13 and the voltage at the first end of the second input transistor N14, and amplifies the sensing result. The sense amplification unit 313 includes two PMOS transistors P12 and P13 which are cross-coupled and two NMOS transistors N11 and N12 which are cross-coupled.

The control unit 315 includes: an NMOS transistor N15 which is connected between a common node of the first and second input transistors N13 and N14 and a ground VSS, and is controlled by a clock signal CLK; a PMOS transistor P14 which is connected between a power supply voltage VDD and a node from which an internal output signal V1 is output, and is controlled by the clock signal CLK; and a PMOS transistor P11 which is connected between the power supply voltage VDD and a node from which a complementary signal V1' (hereinafter referred to as the complementary internal output signal) of the internal output signal V1 is output, and is controlled by the clock signal CLK.

When the clock signal CLK is logic high, the NMOS transistor N15 is turned on, and the PMOS transistors P14 and P11 are turned off. Accordingly, the input reception unit 311 and the sense amplification unit 313 are enabled and operate normally. When the clock signal CLK is logic low, the NMOS transistor N15 is turned off, and the PMOS transistors P14 and P11 are turned on. Accordingly, the input reception unit 311 and the sense amplification unit 313 are disabled and thus do not operate, in which case, the voltages at the node from which the internal output signal V1 is output and at the node from which the complementary internal output signal V1' are output is as high as the power supply voltage VDD.

The inverting buffer 111 inverts the internal output signal V1, buffers the inversion result, and outputs an output signal SEL1 as the buffering result.

The second input buffer 33, like the first input buffer 31, is designed as a cross-coupled sense amplifier and includes an input reception unit 331, a sense amplification unit 333, a control unit 335, and an inverting buffer 131. The input reception unit 331 includes: a first input transistor N33 which has a gate to which a second reference voltage VREFL is applied; and a second input transistor N34 which has a gate to which the input data signal DATA is applied. The gate of the first input transistor N33 corresponds to a positive input terminal (+) of the second input buffer 33, and the gate of the second input transistor N34 corresponds to a negative input terminal (−) of the second input buffer 33. Here, the first and second input transistors N33 and N34 may be NMOS transistors.

The sense amplification unit 333 is connected between a first end of the first input transistor N33 and a first end of the second input transistor N34, senses a difference between the voltage at the first end of the first input transistor N33 and the voltage at the first end of the second input transistor N34, and amplifies the sensing result. The sense amplification unit 333 includes two PMOS transistors P32 and P33 which are cross-coupled and two NMOS transistors N31 and N32 which are cross-coupled.

The control unit 335 includes: an NMOS transistor N35 which is connected between a common node of the first and second input transistors N33 and N34 and the ground VSS, and is controlled by the clock signal CLK; a PMOS transistor P34 which is connected between the power supply voltage VDD and a node from which an internal output signal V2 is output, and is controlled by the clock signal CLK; and a PMOS transistor P31 which is connected between the power supply voltage VDD and a node from which a complementary signal V2' of the internal output signal V2 is output and is controlled by the clock signal CLK.

When the clock signal CLK is logic high, the NMOS transistor N35 is turned on, and the PMOS transistors P34 and P31 are turned off. Accordingly, the input reception unit 331 and the sense amplification unit 333 are enabled and operate normally. When the clock signal CLK is logic low, the NMOS transistor N35 is turned off, and the PMOS transistors P34 and P31 are turned on. Accordingly, the input reception unit 331 and the sense amplification unit 333 are disabled and thus do not operate, in which case, the voltages at the node from which the internal output signal V2 is output and at the node from which the complementary internal output signal V2' is output are as high as the power supply voltage VDD.

The inverting buffer l31 inverts the internal output signal V2, buffers the inversion result, and outputs an output signal SEL2 as the buffering result.

As described above, the second input buffer 33 has the same structure as the first input buffer 31 except that the input data signal DATA is input to the negative input terminal (−) of the second buffer 33, i.e., the gate of the NMOS transistor N34, while the input data signal DATA is input to the positive input terminal (+) of the first input buffer 31, i.e., the gate of the NMOS transistor N13, and that the second reference voltage VREFL is input to the positive input terminal (+) of the second input buffer 33, i.e., the gate of the NMOS transistor N33, while the first reference voltage VREFH is input to the negative input terminal (−) of the first input buffer 31, i.e., the gate of the NMOS transistor N14.

A phase detector 35 includes: a first latch circuit 351 which is designed as a set-reset (SR) latch circuit and latches the output signal SEL1 output by the first input buffer 31 and the output signal SEL2 output by the second input buffer 33; and a second latch circuit 353 which is also designed as an SR latch circuit and latches two output signals of the first latch circuit 351. The second latch circuit 353 outputs an output signal Dl which corresponds to a difference between the phase of the output signal SEL1 and the phase of the output signal SEL2. The first latch circuit 351 includes two NAND gates ND11 and ND13, and the second latch circuit 353 includes two NAND gates ND31 and ND33.

The first and second input buffers 31 and 33 are illustrated in FIGS. 3 and 4 as being synchronized with and controlled by the clock signal CLK. However, it should be understood that the first and second input buffers 31 and 33 may not necessarily be synchronized with and controlled by a clock signal. In addition, the first and second input buffers 31 and 33 are illustrated in FIGS. 3 and 4 as being realized as cross-coupled sense amplifiers, but may be realized as amplifiers other than cross-coupled sense amplifiers. Also, the phase detector 35 is illustrated in FIGS. 3 and 4 as being realized as an SR latch circuit, but may be realized as a circuit other than an SR latch circuit.

FIGS. 5 and 6 are diagrams illustrating the waveforms of signals associated with a dual reference input receiver according to an exemplary embodiment. In detail, FIG. 5 is a diagram illustrating the waveform of signals associated with the dual reference input receiver of FIG. 4 according to an exemplary embodiment when a first reference voltage VREFH is higher than the voltage of an input data signal DATA, and a second reference voltage VREFL is lower than the voltage of the input data signal DATA. FIG. 6 is a diagram illustrating the waveforms of the signals associated with the dual reference input receiver of FIG. 4 according to another exemplary embodiment when the first reference voltage VREFH is higher than a median voltage of the input data signal DATA but lower than the highest voltage of the input data signal DATA, and the second reference voltage VREFL is lower than the median voltage of the input data signal DATA but higher than the lowest voltage of the input data signal DATA.

The operation of the dual reference input receiver of FIG. 4 according to an exemplary embodiment and a method of receiving an input data signal according to an exemplary embodiment, will now be described with reference to FIG. 5. The method of receiving an input data signal according to an exemplary embodiment of is performed by the dual reference input receiver of FIG. 4.

Referring to FIGS. 4 and 5, when the clock signal CLK is logic low, the voltages of the internal output signal V1 and the complementary internal output signal V1' in the first input buffer 31 become as high as the power supply voltage VDD, and the voltages of the internal output signal V2 and the complementary internal output signal V2' in the second input buffer 33 become as high as the power supply voltage VDD.

When the input data signal DATA is input to the dual reference input receiver, the first input buffer 31 senses a difference between the first reference voltage VREFH and the voltage of the input data signal DATA, and amplifies the sensing result in a time period for which the clock signal CLK is logic high. In addition, in the time period for which the clock signal CLK is logic high, the second input buffer 33 senses a difference between the second reference voltage VREFL and the voltage of the input data signal DATA, and amplifies the sensing result.

When a lowest voltage of the input data signal DATA is detected in the time period for which the clock signal CLK is logic high, particularly in a time period P1, the difference between the input data signal DATA and the first reference voltage VREFH is maximized, and the difference between the input data signal DATA and the second reference voltage VREFL is minimized. Accordingly, the first input buffer 31 develops the input data signal DATA at high speed, and the second input buffer 33 develops the input data signal DATA at low speed.

Therefore, the voltage of the internal output signal V1 in the first input buffer 31 reaches a predetermined median level ahead of the internal output signal V2 in the second input buffer 33. Thus, the output signal SEL2 output by the second input buffer 33 becomes logic high a predetermined amount of time T after the output signal SEL1 output by the first input buffer 31 becomes logic high. In this manner, the first and second input buffers 31 and 33 convert a predetermined voltage difference into a time difference (i.e., T).

If the output signal SELL becomes logic high ahead of the output signal SEL2, the output signal DI output by the phase detector 35 becomes logic high when the output signal SELL is logic high.

When a highest voltage of the input data signal DATA is detected in the time period for which the clock signal CLK is logic high, particularly in a time period P2, the difference between the voltage of the input data signal DATA and the first reference voltage VREFH is minimized, and the difference between the input data signal DATA and the second reference voltage VREFL is maximized. Accordingly, the first input buffer 31 develops the input data signal DATA at low speed, and the second input buffer 33 develops the input data signal DATA at high speed.

Therefore, the voltage of the internal output signal V1 in the first input buffer 31 reaches a predetermined median level the predetermined amount of time T after the internal output signal V2 in the second input buffer 33 reaches the predetermined median level. Thus, the output signal SEL1 output by the first input buffer 31 becomes logic high the predetermined amount of time T after the output signal SEL2 output by the second input buffer 33 becomes logic high.

If the output signal SEL2 becomes logic high ahead of the output signal SEL1, the output signal Dl output by the phase detector 35 becomes logic low when the output signal SEL2 is logic high.

If the output signal Dl output by the phase detector 35 is logic high, an internal circuit in a semiconductor device may determine that the input data signal DATA has the low level. On the other hand, if the output signal Dl output by the phase detector 35 is logic low, the internal circuit in the semiconductor device may determine that the input data signal DATA has the high level.

When the first reference voltage VREFH is higher than the median voltage of the input data signal DATA but lower than the highest voltage of the input data signal DATA, and the second reference voltage VREFL is lower than the median voltage of the input data signal DATA but higher than the lowest voltage of the input data signal DATA, as illustrated in FIG. 6, the dual reference input receiver according to an exemplary embodiment operates almost in the same manner as described above with reference to FIG. 5.

Referring to FIG. 6, in a time period P1, the second reference voltage VREFL is higher than the lowest voltage of the input data signal DATA, and thus, the complementary internal output signal V2' in the second input buffer 33 has a lowest voltage.

The speed at which the second input buffer 33 develops the input data signal DATA is as high as the speed at which the first input buffer 31 develops the input data signal DATA, and thus, the voltages of the internal output signal V1 in the first input buffer 31 and the complementary internal output signal V2' almost simultaneously reach a predetermined median level. In the time period P1, the output signal SEL1 output by the first input buffer 31 becomes logic high, and the output signal SEL2 output by the second input buffer 33 is maintained to be logic low. When the output signal SEL1 becomes logic high, the output signal Dl output by the phase detector 35 becomes logic high.

In a time period P2, the first reference voltage VREFH is lower than the highest voltage of the input data signal DATA, and thus, the complementary internal output signal V1' has a low level.

The speed at which the first input buffer 31 develops the input data signal DATA is as high as the speed at which the second input buffer 33 develops the input data signal DATA, and thus, the voltages of the internal output signal V2 in the second input buffer 33 and the complementary internal output signal V1' almost simultaneously reach a predetermined median level. In the time period P2, the output signal SEL2 output by the second input buffer 33 becomes logic high, and the output signal SEL1 output by the first input buffer 31 is maintained to be logic low. When the output signal SEL2 becomes logic high, the output signal Dl output by the phase detector 35 becomes logic low.

Figure 7:
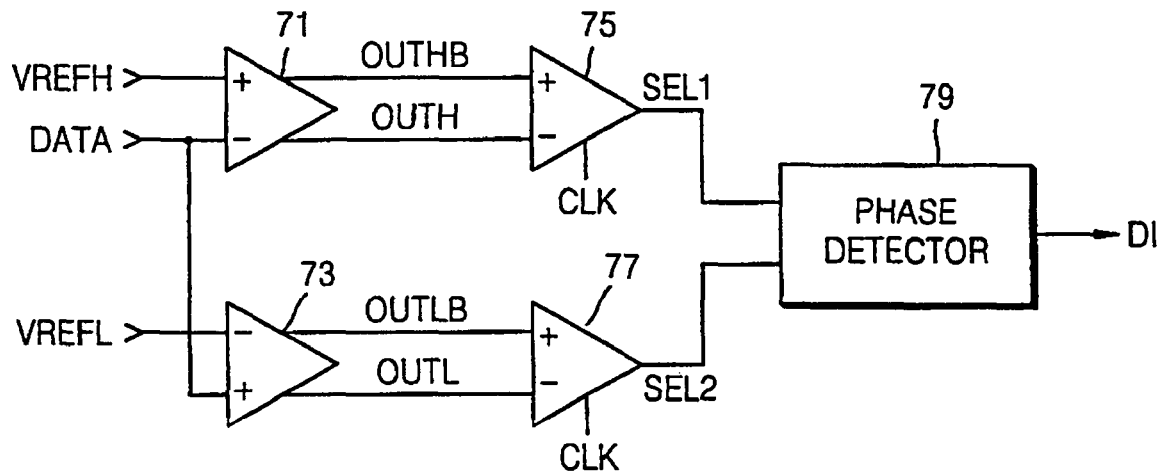
FIG. 7 is a block diagram of a dual reference input receiver according to another exemplary embodiment.

FIG. 7 is a block diagram of a dual reference input receiver according to another exemplary embodiment of the present invention. Referring to FIG. 7, the dual reference input receiver includes a first differential amplifier-type input buffer 71, a second differential amplifier-type input buffer 73, a first sense amplifier-type input buffer 75, a second sense amplifier-type input buffer 77, and a phase detector 79.

The first differential amplifier-type input buffer 71 senses a difference between a first reference voltage VREFH and the voltage of an input data signal, differentially amplifies the sensing result, and outputs an output signal OUTH and a complementary output signal OUTHB as the differential amplification results. Here, the first reference voltage is input to a positive input terminal (+) of the first differential amplifier-type input buffer 71, and the input data signal DATA is input to a negative input terminal (−) of the first differential amplifier-type input buffer 71. The second differential amplifier-type input buffer 73 senses a difference between a second reference voltage VREFL and the voltage of the input data signal DATA, differentially amplifies the sensing result, and outputs an output signal OUTL and a complementary output signal OUTLB as the differential amplification results. Here, the input data signal DATA is input to a positive input terminal (+) of the second differential amplifier-type input buffer 73, and the second reference voltage VREFL is input to a negative input terminal (−) of the second differential amplifier-type input buffer 73.

The first sense amplifier-type input buffer 75 is synchronized with and enabled or disabled by a clock signal CLK, senses a difference between the voltages of the output signal OUTH and the complementary output signal OUTHB output by the first differential amplifier-type input buffer 71, amplifies the sensing result, and outputs an output signal SEL1 as the amplification result. Here, the output signal OUTH is input to a negative input terminal (−) of the first sense amplifier-type input buffer 75, and the complementary output signal OUTHB is input to a positive input terminal (+) of the first sense amplifier-type input buffer 75. The second sense amplifier-type buffer 77 is synchronized with and enabled or disabled by the clock signal, senses a difference between the voltages of the output signal OUTL and the complementary output signal OUTLB output by the second differential amplifier-type input buffer 73, amplifies the sensing result, and outputs an output signal SEL2 as the amplification result. Here, the output signal OUTL is input to a negative input terminal of the second sense amplifier-type input buffer 77, and the complementary output signal OUTLB is input to a positive input terminal of the second sense amplifier-type input buffer 77.

The first sense amplifier-type input buffer 75 has the same structure as the first input buffer 31 of FIG. 3 or 4, and the second sense amplifier-type input buffer 77 has the same structure as the second input buffer 33 of FIG. 3 or 4. The output signal OUTH output by the first differential amplifier-type input buffer 71 is input to the negative input terminal (−) of the first sense amplifier-type input buffer 75, which corresponds to the gate of the second input transistor N14 of the input reception unit 311 of FIG. 4, and the complementary output signal OUTHB output by the first differential amplifier-type input buffer 71 is input to the positive input terminal (+) of the first sense amplifier-type input buffer 75, which corresponds to the gate of the first input transistor N13 of the input reception unit 311 of FIG. 4.

The output signal OUTL output by the second differential amplifier-type input buffer 73 is input to the negative input terminal (−) of the second sense amplifier-type input buffer 77, which corresponds to the gate of the second input transistor N34 of the input reception unit 331 of FIG. 4, and the complementary output signal OUTLB output by the second differential amplifier-type input buffer 73 is input to the positive input terminal (+) of the second sense amplifier-type input buffer 77, which corresponds to the gate of the first input transistor N33 of the input reception unit 331 of FIG. 4.

The first differential amplifier-type input buffer 71 and the first sense amplifier-type input buffer 75 are used for detecting a low level of the input data signal DATA, and the second differential amplifier-type input buffer 73 and the second sense amplifier-type input buffer 77 are used for detecting a high level of the input data signal DATA.

The phase detector 79 detects a difference between the phase of the output signal SELL output by the first sense amplifier-type input buffer 75 and the phase of the output signal SEL2 output by the second sense amplifier-type input buffer 77 and outputs an output signal DI which corresponds to the detection result. The phase detector 79 has the same structure as the phase detector 35 of FIG. 3 or 4.

Figure 8:
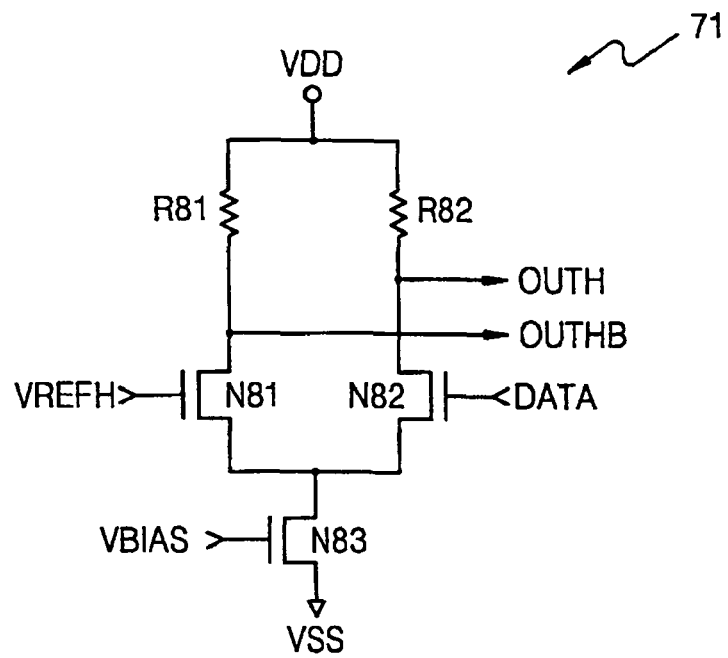
FIG. 8 is a circuit diagram of a first differential amplification input buffer of FIG. 7 according to an exemplary embodiment.
Figure 9:
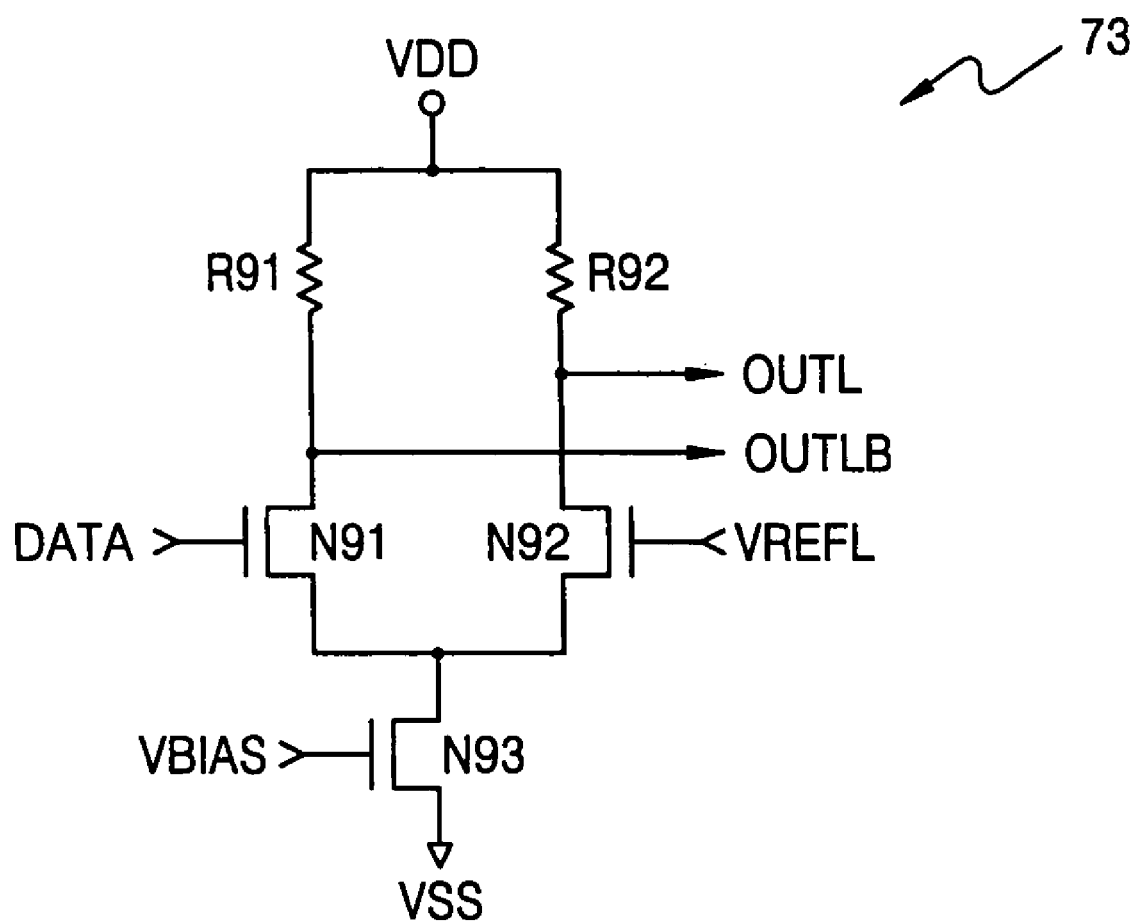
FIG. 9 is a circuit diagram of a second differential amplification input buffer of FIG. 7 according to an exemplary embodiment.

FIG. 8 is a circuit diagram of the first differential amplifier-type input buffer 71 of FIG. 7 according to an exemplary embodiment, and FIG. 9 is a circuit diagram of the second differential amplifier-type input buffer 73 of FIG. 7 according to an exemplary embodiment.

Referring to FIG. 8, the first differential amplifier-type input buffer 71 includes a typical differential amplifier and includes two load resistors R81 and R82, two input transistors N81 and N82, and a bias transistor N83. The first reference voltage VREFH is applied to the gate of the input transistor N81, and the input data signal DATA is applied to the gate of the input transistor N82. The gate of the input transistor N81 corresponds to the positive input terminal (+) of the first differential amplifier-type input buffer 71, and the gate of the input transistor N82 corresponds to the negative input terminal (−) of the first differential amplifier-type input buffer 71. A bias voltage VBIAS for controlling the turning on or off of the bias transistor N83 is applied to the gate of the bias transistor N83. The output signal OUTH is output from a connection node between the load resistor R82 and the input transistor N82, and the complementary output signal OUTHB is output from a connection node between the load resistor R81 and the input transistor N81. Here, the input transistors N81 and N82 and the bias transistor N83 may be NMOS transistors.

Referring to FIG. 9, the second differential amplifier-type input buffer 73 includes a typical differential amplifier and includes two load resistors R91 and R92, two input transistors N91 and N92, and a bias transistor N93. The input data signal DATA is applied to the gate of the input transistor N91, and the second reference voltage VREFL is applied to the gate of the input transistor N92. The gate of the input transistor N91 corresponds to the positive input terminal (+) of the second differential amplifier-type input buffer 73, and the gate of the input transistor N92 corresponds to the negative input terminal (−) of the second differential amplifier-type input buffer 73. A bias voltage VBIAS for controlling the turning on or off of the bias transistor N93 is applied to the gate of the bias transistor N93. The output signal OUTL is output from a connection node between the load resistor R92 and the input transistor N92, and the complementary output signal OUTLB is output from a connection node between the load resistor R91 and the input transistor N91. Here, the input transistors N91 and N92 and the bias transistor N93 may be NMOS transistors. The operation of the first or second differential amplifier-type input buffer 71 and 73 should be understood, and thus detailed description thereof is omitted for the sake of brevity.

The operation of the dual reference input receiver of FIG. 7 is almost the same as the operation of the dual reference input receiver of FIG. 3, and a method of receiving an input data signal performed by the dual reference input receiver of FIG. 7 is almost the same as the method of receiving an input data signal performed by the dual reference input receiver of FIG. 3. Therefore, detailed descriptions of the operation of the dual reference input receiver of FIG. 7 and the method of receiving an input data signal performed by the dual reference input receiver of FIG. 7 will be omitted for the sake of brevity.

The first and second sense amplifier-type input buffers 75 and 77 are illustrated in FIG. 7 as being synchronized with and controlled by the clock signal CLK, but may not necessarily be synchronized with or controlled by the clock signal CLK. In addition, the dual reference input receiver according to an exemplary embodiment of the present invention is illustrated in FIG. 7 as including the first and second sense amplifier-type input buffers 75 and 77, but may include various types of amplifiers other than sense amplifiers.

Also, it should be understood that the first differential amplifier-type input buffer 71 of FIG. 7 may not have the structure illustrated in FIG. 8, and the second differential amplifier-type input buffer 73 may not have the structure illustrated in FIG. 9. In addition, the phase detector 79, like the phase detector 35 of FIG. 3, may be realized as an SR latch circuit. However, the phase detector 79 may be realized as a circuit other than an SR latch circuit.

In the dual reference input receiver according to an exemplary embodiment and the method of receiving an input data signal according to an exemplary embodiment, a single data signal DATA applied from an external source is used, and thus, only one pin for receiving the data signal DATA is required. Therefore, it is possible to provide the same advantage as a single-ended signalling method, i.e., reduce a total number of pins required. As described above, in the dual reference input receiver according to an exemplary embodiment and the method of receiving an input data signal according to an exemplary embodiment, two reference voltages, i.e., a first reference voltage and a second reference voltage which is lower than the first reference voltage, are used. Therefore, it is possible to provide the same advantage as a differential signalling method, i.e., provide a wide input data eye.

As described above, it is possible to provide the same advantage as a single-ended signalling method, i.e., reduce a total number of pins required. In addition, it is possible to provide the same advantage as a differential signalling method, i.e., provide a wide input data eye.

While the present invention has been particularly shown and described with reference to exemplary embodiments thereof, it will be understood by those of ordinary skill in the art that various changes in form and details may be made therein without departing from the spirit and scope of the present invention as defined by the following claims.

what is claimed is;

1. An input receiver that receives an input data signal, the input receiver comprising:
    a first input buffer that is synchronized with and enabled by a clock signal, that senses a difference between a voltage of the input data signal and a first reference voltage to provide a first sensing result, and that amplifies the first sensing result, the input data signal and the first reference voltage being respectively input to a positive input terminal and a negative input terminal of the first input buffer;
    a second input buffer that is synchronized with and enabled by the clock signal, that senses a difference between a second reference voltage and the voltage of the input data signal to provide a second sensing result, and that amplifies the second sensing result, the second reference voltage and the input data signal being respectively input to a positive input terminal and a negative input terminal of the second input buffer; and a phase detector that detects a difference between a phase of an output signal of the first input buffer and a phase of an output signal of the second input buffer, and that outputs a detection output signal corresponding to a detection result, wherein the first input buffer comprises:

an input reception unit that comprises a first input transistor having a gate to which the input data signal is applied and a second input transistor having a gate to which the first reference voltage is applied;

a sense amplification unit that is connected to a first end of the first input transistor and a first end of the second input transistor, that senses a difference between a voltage at the first end of the first input transistor and a voltage at the first end of the second input transistor as the first sensing result, and that amplifies the first sensing result; and a control unit that enables the input reception unit and the sense amplification unit responsive to the clock signal, wherein the gate of the first input transistor is the positive input terminal of the first input buffer, and the gate of the second input transistor is the negative input terminal of the first input buffer.

2. The input receiver of claim 1, wherein the first reference voltage is higher than a median voltage of the input data signal.

3. The input receiver of claim 1, wherein the second reference voltage is lower than a median voltage of the input data signal.

4. The input receiver of claim 2, wherein the first reference voltage is a power supply voltage.

5. The input receiver of claim 3, wherein the second reference voltage is ground.

6. The input receiver of claim 1, wherein each of the first and second input buffers comprises a cross-coupled sense amplifier.

7. The input receiver of claim 1, wherein the second input buffer comprises:

an input reception unit that comprises a first input transistor having a gate to which the second reference voltage is applied and a second input transistor having a gate to which the input data signal is applied;

a sense amplification unit that is connected to a first end of the first input transistor and a first end of the second input transistor, that senses a difference between a voltage at the first end of the first input transistor and a voltage at the first end of the second input transistor as the second sensing result, and that amplifies the second sensing result; and a control unit that enables the input reception unit and the sense amplification unit responsive to the clock signal, wherein the gate of the first input transistor is the positive input terminal of the second input buffer, and the gate of the second input transistor is the negative input terminal of the second input buffer.

8. An input receiver that receives an input data signal, the input receiver comprising:

a first input buffer that senses a difference between a voltage of the input data signal and a first reference voltage to provide a first sensing result, and that amplifies the first sensing result, the input data signal and the first reference voltage being respectively input to a positive input terminal and a negative input terminal of the first input buffer;

a second input buffer that senses a difference between a second reference voltage and the voltage of the input data signal to provide a second sensing result, and that amplifies the second sensing result, the second reference voltage and the input data signal being respectively input to a positive input terminal and a negative input terminal of the second input buffer; and a phase detector that detects a difference between a phase of an output signal of the first input buffer and a phase of an output signal of the second input buffer, and that outputs a detection output signal corresponding to a detection result, wherein the first input buffer comprises:

an input reception unit that comprises a first input transistor having a gate to which the input data signal is applied and a second input transistor having a gate to which the first reference voltage is applied; and a sense amplification unit that is connected to a first end of the first input transistor and a first end of the second input transistor, that senses a difference between a voltage at the first end of the first input transistor and a voltage at the first end of the second input transistor as the first sensing result, and that amplifies the first sensing result, wherein the gate of the first input transistor is the positive input terminal of the first input buffer, and the gate of the second input transistor is the negative input terminal of the first input buffer.

9. The input receiver of claim 8, wherein the first reference voltage is higher than a median voltage of the input data signal.

10. The input receiver of claim 8, wherein the second reference voltage is lower than a median voltage of the input data signal.

11. The input receiver of claim 9, wherein the first reference voltage is a power supply voltage.

12. The input receiver of claim 10, wherein the second reference voltage is ground.

13. The input receiver of claim 8, wherein each of the first and second input buffers comprises a cross-coupled sense amplifier.

14. The input receiver of claim 8, wherein the first input buffer further comprises a control unit that enables the input reception unit and the sense amplification unit responsive to a clock signal.

15. The input receiver of claim 8, wherein the second input buffer comprises:

an input reception unit that comprises a first input transistor having a gate to which the second reference voltage is applied and a second input transistor having a gate to which the input data signal is applied; and a sense amplification unit that is connected to a first end of the first input transistor and a first end of the second input transistor, that senses a difference between a voltage at the first end of the first input transistor and a voltage at the first end of the second input transistor to provide a second sensing result, and that amplifies the second sensing result, wherein the gate of the first input transistor is the positive input terminal of the second input buffer, and the gate of the second input transistor is the negative input terminal of the second input buffer.

16. The input receiver of claim 15, wherein the second input buffer further comprises a control unit that enables the input reception unit and the sense amplification unit responsive to a clock signal.

17. A method of receiving an input data signal comprising:
receiving the input data signal and a first reference voltage respectively via a positive input terminal and a negative input terminal of a first input buffer, and outputting a first output signal by enabling the first input buffer to sense a difference between a voltage of the input data signal and the first reference voltage as a first sensing result and to amplify the first sensing result while a clock signal is in a first logic state, wherein the first reference voltage is higher than a median voltage of the input data signal;
receiving a second reference voltage and the input data signal respectively via a positive input terminal and a negative input terminal of a second input buffer, and outputting a second output signal by enabling the second input buffer to sense a difference between the second reference voltage and the voltage of the input data signal as a second sensing result and to amplify the second sensing result while the clock signal is in the first logic state, wherein the second reference voltage is lower than the median voltage of the input data signal; and
enabling a phase detector to detect a difference between a voltage of the first output signal and a voltage of the second output signal, and to output a detection output signal corresponding to a detection result,
wherein the first input buffer comprises an input reception unit, an amplification unit, and a control unit,
wherein the input reception unit comprises a first input transistor and a second input transistor, and wherein the method includes applying the input data signal to a gate of the first input transistor and applying the first reference voltage to a gate of the second input transistor;
wherein the sense amplification unit is connected to a first end of the first input transistor and a first end of the second input transistor, and wherein the method includes using the sense amplification unit to sense a difference between a voltage at the first end of the first input transistor and a voltage at the first end of the second input transistor as the first sensing result, and to amplify the first sensing result; and
wherein the control unit enables the input reception unit and the sense amplification unit responsive to the clock signal,
wherein the gate of the first input transistor is the positive input terminal of the first input buffer, and the gate of the second input transistor is the negative input terminal of the first input buffer.

18. The method of claim 17, wherein the first reference voltage is a power supply voltage.

19. The method of claim 17, wherein the second reference voltage is ground.

20. The method of claim 17, wherein each of the first and second input buffers comprises a cross-coupled sense amplifier.

21. A method of receiving an input data signal comprising:
receiving the input data signal and a first reference voltage respectively via a positive input terminal and a negative input terminal of a first input buffer, and outputting a first output signal by enabling the first input buffer to sense a difference between a voltage of the input data signal and the first reference voltage as a first sensing result and to amplify the first sensing result, wherein the first reference voltage is higher than a median voltage of the input data signal;
receiving a second reference voltage and the input data signal respectively via a positive input terminal and a negative input terminal of a second input buffer, and outputting a second output signal by enabling the second input buffer to sense a difference between the second reference voltage and the voltage of the input data signal as a second sensing result and to amplify the second sensing result, wherein the second reference voltage is lower than the median voltage of the input data signal; and
enabling a phase detector to detect a difference between a voltage of the first output signal and a voltage of the second output signal, and to output a detection output signal corresponding to a detection result,
wherein the first input buffer comprises an input reception unit and an amplification unit,
wherein the input reception unit comprises a first input transistor and a second input transistor, and wherein the method includes applying the input data signal to a gate of the first input transistor and applying the first reference voltage to a gate of the second input transistor;
wherein the sense amplification unit is connected to a first end of the first input transistor and a first end of the second input transistor, and wherein the method includes using the sense amplification unit to sense a difference between a voltage at the first end of the first input transistor and a voltage at the first end of the second input transistor as the first sensing result, and to amplify the first sensing result; and
wherein the gate of the first input transistor is the positive input terminal of the first input buffer, and the gate of the second input transistor is the negative input terminal of the first input buffer.

22. The method of claim 21, wherein the first reference voltage is a power supply voltage.

23. The method of claim 21, wherein the second reference voltage is ground.

24. The method of claim 21, wherein each of the first and second input buffers comprises a cross-coupled sense amplifier.

* * * * *